M. SHOELD.
PROCESS OF MAKING PERMANGANATES.
APPLICATION FILED JUNE 14, 1917.
1,281,085.
Patented Oct. 8, 1918.
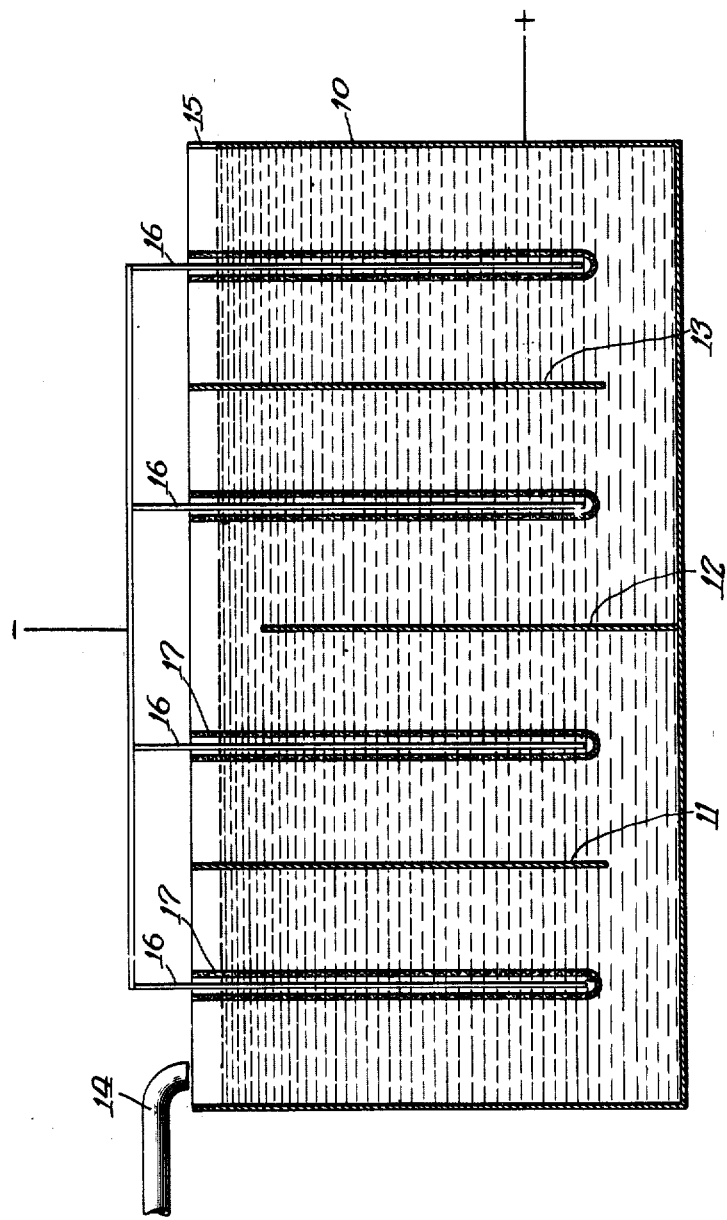
Witness:
Geo. C. Morrison
Inventor
Mark Shoeld
By Walter M. Fuller
Atty.

UNITED STATES PATENT OFFICE.

MARK SHOELD, OF CHICAGO, ILLINOIS, ASSIGNOR TO ARMOUR FERTILIZING WORKS, OF CHICAGO, ILLINOIS, A CORPORATION OF NEW JERSEY.

PROCESS OF MAKING PERMANGANATES.

1,281,085.    Specification of Letters Patent.    Patented Oct. 8, 1918.

Application filed June 14, 1917. Serial No. 174,660.

*To all whom it may concern:*

Be it known that I, MARK SHOELD, a subject of the King of Sweden, residing at Chicago, in the county of Cook and State of Illinois, have invented certain new and useful Improvements in Processes of Making Permanganates, of which the following is a specification.

My invention pertains to the economical production of permanganates, such, for example, as potassium permanganates, on a commercial scale, one of its leading aims being to provide such a chemical product at a minimum of expense. To this end, during the earlier steps of the process, I employ some other cheaper alkali or element than that of the desired ultimate permanganate and then convert such other chemical into the required permanganate, thus avoiding losses of the more costly material through the initial or preliminary steps of the process. For example, in the manufacture of potassium permanganate I first provide sodium manganate, converting this into sodium permanganate, and then change the latter into potassium permanganate. In such specific example the sodium manganate is changed to sodium permanganate, preferably, by electrolysis, and any losses occurring take place in connection with the sodium instead of the more expensive potassium.

The published or recognized methods of making potassium permanganate are laboratory processes, not feasible, or impossible, to work or employ commercially and on a large scale. By these laboratory processes, the permanganate of potash is made by heating powdered manganese dioxid intimately mixed with potassium hydroxid. This produces potassium manganate which is dissolved in water and decomposed with an acid, preferably, carbon dioxid, whereupon the manganate is decomposed into potassium permanganate which is allowed to crystallize out. On account of the prohibitive prices of potassium hydrate, the low yield of the desired product, and the considerable losses in practising the method, this process cannot be used on a commercial scale even with the prevailing high prices of the product.

In the accompanying drawing forming a part of this specification, I have illustrated a preferred and desirable form or style of electrolytic tank for use in carrying out the process, or rather, a portion of the process.

By way of illustration only, I will describe my novel and advantageous process in connection with the manufacture of potassium permanganate, but it is to be understood that the invention or discovery is not limited and restricted to the production of any particular chemical.

The sodium manganate is first produced by mixing powdered sodium hydroxid and powdered manganese dioxid in the desired proportions and heating such mixture to redness the required time, whereupon such sodium manganate is dissolved in water to a specific gravity of 1.15 to 1.20, which solution, after settling, is run in a slow stream through an electrolytic tank, the decomposition of the solution converting the sodium manganate into sodium permanganate, reduction by the released hydrogen being prevented.

Referring to the drawing for a more complete understanding of the construction of such electrolytic tank, it will be observed that the partition or division walls 11, 12, and 13, which divide the tank 10 into communicating chambers, compartments, or cells, are in electrical contact with such metallic tank or casing, the latter being connected, as illustrated, with the positive electrode of the electric circuit, so that these metallic partition walls, as well as the casing, constitute positive electrodes. The walls 11 and 13 do not reach to the bottom of the tank, and the wall 12 does not extend to the top of the liquid in the tank so that the solution, entering the tank from the pipe 14, passes beneath wall 11, over wall 12, and beneath wall 13, overflowing at 15. The negative electrodes 16, one of which is provided for each compartment of the tank, are connected together and to the negative wire of the circuit, as shown, and each of these negative electrodes is inclosed within an asbestos, or other suitable porous shell or casing 17, which permits the ready discharge of the hydrogen formed at the electrode, but prevents such hydrogen from detrimentally affecting the reaction occurring in the tank. By the use of this construction the solution is caused or compelled to flow slowly through all of the tank compartments in series and be adequately subjected to the electrolytic action, the rate of flow being regulated to convert all of the sodium manganate into sodium permanganate.

The temperature of the solution in the electrolytic tank should be approximately 130 to 150 degrees Fahrenheit. If higher temperatures and density are employed, a certain amount of the sodium permanganate formed is decomposed into caustic and manganese dioxid, which, of course, is undesirable, and should be avoided.

To the sodium permanganate solution from the electrolytic tank, a proper amount of potassium carbonate solution is added, the resulting solution being boiled down to a specific gravity of 1.24 to 1.25 and allowed to cool, whereupon the potassium permanganate separates out. If it is boiled to a higher density than that specified, part of the potassium permanganate reverts to potassium manganate and part is decomposed to caustic and manganese dioxid. The potassium permanganate is recrystallized out of water and dried, giving a product of 99½ to 100 per cent. potassium permanganate.

The mother liquor remaining from the production of the potassium permanganate contains sodium hydroxid and potassium carbonate, the latter representing a small excess used in the production of the potassium permanganate, and this mother liquor when boiled down is used in the production of the sodium manganate instead of straight sodium hydroxid as indicated above, the carbonate content of this liquor being, however, comparatively low.

I have indicated above the adding of the potassium carbonate after the production of the sodium permanganate, but it or any other desirable potassium salt may be added to the mixture before making the sodium manganate or it may be added to the sodium manganate solution before the production of the sodium permanganate by the electrolytic action specified.

To those skilled in this art it will be apparent that several changes may be incorporated in the process set forth without departure from the essence of the invention and without the sacrifice of any of its substantial benefits and advantages. For example, instead of changing the sodium manganate into sodium permanganate by the electrolytic action specified, a similar result may be accomplished, if preferred, by treating the sodium manganate with an acid, such as carbon dioxid, but the former method is preferable. The negative ions from carbonate seem to be considerably more active than the negative ions from hydroxid or manganate, that is, when the negative ions in each case combine with water the oxygen set free seems to be more active in the case of the first mentioned salt and this facilitates the desired reaction.

I claim:

1. The process of making a permanganate consisting in converting a manganate into a permanganate by electrolysis in the presence of an alkali salt other than manganate, substantially as described.

2. The process of making an alkali permanganate consisting in converting an alkali manganate into the corresponding permanganate and then converting such permanganate into a permanganate of a different alkali, substantially as described.

3. The process of making an alkali permanganate consisting in converting an alkali manganate into a permanganate by electrolysis and then converting such permanganate into a permanganate of a different alkali, substantially as described.

4. The process of making potassium permanganate consisting in converting sodium manganate into sodium permanganate and then converting such sodium permanganate into potassium permanganate, substantially as described.

5. The process of making potassium permanganate consisting in treating sodium permanganate with a potassium salt, substantially as described.

6. The process of making potassium permanganate consisting in converting sodium manganate into sodium permanganate by electrolysis and then converting such sodium permanganate into potassium permanganate, substantially as described.

7. The process of making potassium permanganate consisting in converting sodium manganate into sodium permanganate by electrolysis and then converting such sodium permanganate into potassium permanganate by adding a potassium salt, substantially as described.

8. The process of making potassium permanganate consisting in making sodium manganate, converting the same into sodium permanganate by electrolysis, and producing potassium permanganate by the addition of potassium carbonate, substantially as described.

9. The process of producing potassium permanganate which consists in making sodium manganate from sodium hydroxid, converting said sodium manganate into sodium permanganate by electrolysis, and converting said sodium permanganate into potassium permanganate by the addition of a potassium salt, and using for a continuance of the process the sodium hydroxid in the mother liquor from which the potassium permanganate was produced for the production of the sodium manganate and the excess of the potassium salt in such mother liquor to assist in the conversion of the sodium permanganate into potassium permanganate, substantially as described.

10. The process of producing potassium permanganate which consists in making sodium manganate from sodium hydroxid, converting said sodium manganate into sodium permanganate, and converting said sodium permanganate into potassium permanganate by the addition of a potassium salt, and using for the continuance of the process the sodium hydroxid in the mother liquor from which the potassium permanganate was produced for the production of the sodium manganate and the excess of the potassium salt in such mother liquor to assist in the conversion of the sodium permanganate into potassium permanganate, substantially as described.

11. The process of producing potassium permanganate which consists in making sodium manganate from sodium hydroxid, converting said sodium manganate into sodium permanganate, converting said sodium permanganate into potassium permanganate, and using the sodium hydroxid in the mother liquor from which the sodium permanganate was produced for the production of the sodium manganate for a continuance of the process, substantially as described.

12. The process of producing a permanganate which consists in making a manganate of a different alkali from the corresponding caustic, converting said manganate into the corresponding permanganate, converting said permanganate into the desired permanganate of a different alkali, and using the caustic of the mother liquor from which the first permanganate was produced for the continuance of the process, substantially as described.

13. The process of producing a permanganate which consists in making a manganate from a caustic, converting said manganate into a permanganate, crystallizing out such permanganate, and recovering the caustic used as such for the continuance of the process, substantially as described.

MARK SHOELD.

Correction in Letters Patent No. 1,281,085.

It is hereby certified that the name of the assignee in Letters Patent No. 1,281,085, granted October 8, 1918, upon the application of Mark Shoeld, of Chicago, Illinois, for an improvement in "Processes of Making Permanganates," was erroneously written and printed as " Armour Fertilizing Works," whereas said name should have been written and printed as *Armour Fertilizer Works;* and that the said Letters Patent should be read with this correction therein that the same may conform to the record of the case in the Patent Office.

Signed and sealed this 19th day of November, A. D., 1918.

[SEAL.]

R. F. WHITEHEAD,
*Acting Commissioner of Patents.*

Cl. 204—9.